United States Patent [19]

Chung

[11] 4,421,777

[45] Dec. 20, 1983

[54] METHOD FOR IMPROVING THE YIELD OF CHOCOLATE CAKE

[75] Inventor: Frank H. Y. Chung, Norwalk, Conn.

[73] Assignee: Nutrisearch Company, Cincinnati, Ohio

[21] Appl. No.: 248,592

[22] Filed: Mar. 27, 1981

[51] Int. Cl.³ .............................................. A21D 10/04
[52] U.S. Cl. ..................................... 426/553; 426/551
[58] Field of Search .............................. 426/551–555, 426/583

[56] References Cited

U.S. PATENT DOCUMENTS

| | | | |
|---|---|---|---|
| 3,941,895 | 3/1976 | Ash et al. | 426/553 |
| 3,943,264 | 3/1976 | Davis | 426/583 |
| 4,089,987 | 5/1978 | Chang | 426/583 |
| 4,103,038 | 7/1978 | Roberts | 426/583 |
| 4,109,025 | 8/1978 | Lauck | 426/553 |

OTHER PUBLICATIONS

Tressler et al., *Food Products Formulary, Cereals, Baked Goods, Dairy and Egg Products*, vol. 2, Avi Pub. Co. Inc., Westport, Conn., 1975, p. 67.

*Primary Examiner*—Raymond N. Jones
*Assistant Examiner*—Elizabeth A. Hatcher
*Attorney, Agent, or Firm*—Cushman, Darby & Cushman

[57] ABSTRACT

A process for preparing a chocolate flavored cake comprising mixing together and baking cake ingredients, the improvement, comprising adding to the ingredients of about 3% to about 15% on a flour basis of (1) a defined whey protein-containing composition in combination with (2) an amount of sodium bicarbonate sufficient to elevate the pH of the cake crumb to a pH within the range of about 7.5 to about 9.

7 Claims, No Drawings

METHOD FOR IMPROVING THE YIELD OF CHOCOLATE CAKE

BACKGROUND OF THE INVENTION

The present invention relates to a process for improving the yield and texture characteristics of chocolate cake and particularly chocolate sponge cake.

DESCRIPTION OF THE PRIOR ART

Chocolate cake is a well known item of dessert in this country as well as other countries in the world. Chocolate cakes are usually prepared by recipes somewhat different than recipes needed to prepare an ordinary plain cake because the addition of chocolate or cocoa to the recipe makes the batter thicker, more acid and less sweet. Since the color of chocolate cake varies greatly with pH, extra soda is usually added to maintain the pH. In the same vein, cocoa is often treated with an alkali during its manufacture to make it darker in color, less acid in flavor and less likely to settle in a cup. Alkali treated cocoa is generally called Dutch process cocoa (Foods, An Introductory College Course by G. E. Vail, 5th edition, Houghton Mifflin Company at page 104).

The pH is also responsible for flavor characteristics. A chocolate product with an acidic pH loses its typical flavor notes. An alkaline pH is required to develop the full flavor of the chocolate. A typical pH value for a chocolate cake ranges between about 7.5 and 8.0 whereas a typical pH for a devil's food cake ranges from about 8.0 to 9.0. The use of excess alkali to develop extremely dark color in a chocolate provides a soapy taste and is to be avoided (see an article entitled "The Role of pH in Cake Baking" by D. J. Ash and J. C. Colmey, The Baker's Digest, February 1973, pages 38 et seq. and Experimental Cookery 4th Edition, E. Lowe, John Wiley and Sons (1966) at page 492). Also of interest to the question of pH in cakes is an article entitled "Observations on the Hydrogen-ion Concentration of Cakes," Cereal Chem. 16 419–423 (1939).

It is also known that the use of cocoa in a sponge cake recipe will provide a cake with reduced specific volume, will lower the pH to a level where color, taste and texture of the cake are effected and produce a close grained cake. The addition of soda to elevate the pH to the level needed to provide an acceptable color and flavor also has the adverse effect of further adversely effecting the texture. The addition of more soda provides a cake which is tender and gummy. While this type of cake may be usable for home use, such cake is not adaptable for machine handling including machine cream filling, machine slicing and machine wrapping. The gummy texture of the cake does not allow the knives to cleanly slice the cake. The tender texture of the cake can effect filling and wrapping procedures.

By private communication, applicant was made aware of the fact that the addition of a whey protein concentrate in a small amount to a sponge cake recipe containing chocolate or cocoa will provide a slight increase in specific volume. However, the increase is not sufficient to restore the lost volume.

In some previous work, the replacement of whole egg solids on a weight/weight basis with a whey protein concentrate prepared by molecular sieve separation provided a chocolate cake with a moist ring on the top.

It is also known to use whey protein concentrate plus gelatin, gelatin and a polyphosphate and/or a gum as an egg albumen replacer for yellow and sponge cake (U.S. Pat. No. 4,089,987). U.S. Pat. No. 4,103,038 shows the use of whey protein concentrate prepared by ultrafiltration as an ingredient in a egg albumen replacer in devil's food cake (see Example 5). It is also known to replace NFDM on a solids/solids basis in cake with a whey protein concentrate (U.S. Pat. No. 3,941,895).

There is, therefore, a need to provide a chocolate cake and particularly a chocolate sponge cake, system, with a sufficiently elevated pH to provide proper color and taste as well as sufficient texture, moisture content, and strength to allow for good machine handling.

BRIEF DESCRIPTION OF THE INVENTION

In accordance with the present invention, it has been found that a cake corresponding to the foregoing requirements can be prepared by blending with the ingredients normal to a chocolate cake (including eggs), and particularly a chocolate sponge cake, from about 3% to about 15% on a flour basis of a defined protein composition in combination with sufficient additional soda to provide a pH within the range of from about 8 to about 9 and preferably from about 8.5 to about 9. The combination of the whey-protein composition and the soda provides a chocolate cake, and particularly, a chocolate sponge cake, of fine, uniform and resilient character, which has good specific volume and the pH necessary for color and flavor development without being unduly tender or gummy. The cake produced in accordance with the invention can be more effectively utilized in machine handling and processing as it is firm enough to withstand machine handling conditions and dry enough for good machine slicing without providing a stale mouth feel.

As used herein, all percentages are on a dry-weight basis unless otherwise noted.

DETAILED DESCRIPTION OF THE INVENTION

The whey protein-containing composition for use in the present invention preferably contains from about 35% to about 80% dairy derived protein on a dry solids basis. Of that dairy derived protein, at least 50%, preferably at least 75%, more preferably at least 90% and most preferably 100% of the protein is whey protein. The whey protein is generally provided by a whey protein concentrate (at least 35% protein). On a solids basis, the whey protein-containing composition is preferably comprised of at least 40% and preferably from about 50% to about 100% of a whey protein concentrate having at least 35% protein, from 0 to about 50% and preferably from 0 to about 35% of another whey-protein containing product and from 0 to about 35% of another dairy derived protein product.

The whey protein concentrate as well as other whey-protein containing products used in the present invention can be derived from cheese whey, casein whey and soy whey and preferably cheese whey. Cheese whey is the by-product of the acid or rennet coagulation of protein (casein) from milk.

Sweet whey or cheddar whey is obtained by the separation and removal of coagulated casein produced by the addition of a protolytic enzyme to milk. The protolytic enzymes generally used are known as rennin and/or pepsin. Specific examples of cheese products produced by this method include cheddar cheese, swiss cheese and mozzarella.

The preferred whey protein concentrate for use in the invention is derived from acid or cottage cheese whey which is the by-product obtained from the acid coagulation of milk protein by the use of lactic acid producing bacteria (e.g., lactobacillus) or by the addition of food grade acids such as lactic or hydrochloric acid, i.e., direct acidification. In either case, acidification is allowed to proceed until a pH of approximately 4.6 is reached. At this pH, casein becomes insolubilized and coagulates as cheese cured.

The whey protein concentrate as used in the invention is most preferably derived from 100% acid cheese whey though minor amounts of other cheese wheys of less than 50% and preferably less than 20% can be utilized. Such other cheese wheys include but are not limited to cheddar cheese whey. It is preferred that the whey source be at least 90% acid whey.

The whey protein concentrate used in the invention can be prepared by any one of a number of known processes including electrodialysis (Stribley, R. C., Food Processing, Volume 24, No. 1, page 49, 1963), reverse osmosis, (Marshall, P. G. et al., Fractionation and Concentration of Whey by Reverse Osmosis, Food Technology, 22(a), 696, 1968), gel filtration (U.S. Pat. No. Re. 27,806); or by ultrafiltration (Horton, B. S. et al., Food Technology, Volume 26, page 30, 1972). Chemical methods including the phosphate precipitation of whey protein can also be used as described in Gordon U.S. Pat. No. 2,388,624 and Melachouris U.S. Pat. No. 4,043,990. Products such as lactalbumin phosphate are also to be considered whey protein concentrates. The disclosures of the foregoing articles and patents are incorporated herein by reference. The whey protein concentrate should contain at least 35% protein based on total Kjeldahl nitrogen.

It has been found that the most effective results are obtained using an ultrafiltered acid (cottage cheese) whey concentrate containing from about 40% to about 60% and preferably about 45% to about 55% whey protein. In a typical process, cottage cheese whey is neutralized to a pH of about 6.4 with 50% caustic. After storage, the pH is then adjusted to about 7.2 and any solids or precipitates are removed by centrifugal clarifiers. The clarified liquor is then pasteurized. The liquor is then fed into an ultrafiltration membrane unit. The retentate is condensed and spray dried. Protein products containing 35% or more whey protein can be prepared by this process. Products generally comprising from about 40% to 60% protein (TKN X 6.38), 10–30% lactose, 3–15% ash, and 0.1–4% fat are obtained. The dried retentate with the aforegiven composition is considered a whey protein concentrate. While it is preferred to use the whey protein concentrate in the dry form, the liquid form can also be used on a percent by weight solids basis. Liquid levels in the final formulation are adjusted to the correct solid/liquid ratio. Liquid whey protein concentrate must be kept under refrigeration to prevent spoilage.

The whey protein concentrate must be substantially non-heat denatured. By non-heat denatured is meant that at least 40% of the protein in the concentrate as determined by solubility at pH 4.6 has not been denatured by the heating which is utilized in the preparation such as in pasteurization and drying. Under certain conditions it may be more advisable to freeze-dry since freeze-drying would denature less protein than spray drying. Other forms of denaturation which do not effect the end properties of the whey protein can be used such as using a sulfite in an amount of from about 0.1% to about 0.5% to reduce the coagulation temperature of the whey protein.

The whey protein concentrate can also be combined with another protein-containing whey based product such as dried whey, delactosed whey, calcium treated delactosed whey, delactosed/demineralized whey where demineralization is accomplished by any known method such as electrodialysis, ion exchange or material transfer (ultrafiltration, reverse osmosis), the dried permeate and dried delactosed permeate resulting from the ultrafiltration of whey, the precipitate prepared by neutralizing acid whey as is disclosed in U.S. Pat. No. 4,036,999 and the precipitate prepared by adding calcium ion to sweet whey followed by neutralization as disclosed in U.S. Pat. No. 3,560,219 as well as the dried mother liquor remaining after separation of these precipitates. Of these materials, the precipitates prepared in accordance with U.S. Pat. Nos. 3,560,219 and 4,036,999 are preferred, the disclosures of which are incorporated herein by reference.

Other non-whey based diary protein compositions which can be used include milk and milk solids, e.g. NFDM, casein and caseinates including sodium, potassium and calcium caseinate. Also included are such products as lactalbumin which may be too heat denatured to fall within the definition of whey protein concentrate.

The preferred composition for use in the invention is an ultrafiltered acid cheese whey composition having from about 45% to about 55% whey protein alone or in combination with up to 35% by weight on a dry solids basis of another whey-based product (provided the protein content of the blend is within the range of from about 35% to about 80%). The other whey-based product is preferably delactosed or calcium treated delactosed whey.

Also usable in the invention is a blend of from about 45% to about 60% whey protein concentrate, 10% to 30% caseinate, preferably calcium caseinate and from about 20% to about 35% delactosed and preferably calcium treated delactosed whey.

Cakes are generally classified in two main categories, i.e. batter type cakes and foam type cakes. In the batter type cake all the ingredients are slowly and smoothly blended to obtain a batter which does not evidence any foam. Gas is generated during baking from the leavening to give the cake its aerated quality. Foam type cakes rely on aeration beaten into the batter to form the framework of the cake. Much of the aeration is provided by beating. The foam type cake generally forms a tougher cell structure with a more open grain than that achieved with batter type cakes. Batter type cakes are well known as chocolate layer cakes while the foam type cake is generally illustrated by the sponge or angel food type cakes.

A chocolate batter type cake generally contains cake flour, sugar, milk or milk powder, salt, leavening such as baking powder, egg or egg solids, oil or shortening, an emulsifier, chocolate or cocoa and water. A chocolate sponge cake generally contains similar ingredients though the amount of eggs or egg solids is generally greater, the amount of leavening is usually less and there is little to no oil or shortening. The cakes of the present invention preferably contain from about 5% to about 40% egg solids on a flour basis. Chocolate cake preferably contains from about 5 to about 20% egg solids and chocolate sponge cake preferably contains from about 10 to about 30% and more preferably from about 15 to about 30% egg solids. The term egg solids is generally intended to refer to whole eggs, whole egg solids, combinations of egg yolk and albumen and mixtures thereof. Preferably combinations of egg yolk and albumen are used in amounts equivalent to whole eggs. Extra egg yolk or albumen over and above that needed to form an equivalent egg can be used. It is preferred that the excess not exceed 25% by weight of the whole egg. These are traditional ingredients for chocolate sponge cake as known to any baker of ordinary skill (see Experimental Cookery, 4th Edition, Belle Lowe, John Wiley and Sons, Inc. (1966) at page 492).

The ingredients for a chocolate batter type cake are generally creamed under such conditions that excessive foaming is not allowed to take place. A chocolate sponge cake must be whipped under conditions which allow air to be incorporated into the batter. In general, the dry ingredients are normally combined under the conditions for the type of cake to be made, said dry ingredients to include the whey protein-containing composition and the soda required in accordance with the invention. Emulsifier and, if present, oil are generally added next, and finally the water. The practice of the invention does not require a deviation from prior art procedures for preparing cakes of these kinds and types.

The whey protein-containing compositions is generally added in an amount ranging from about 3% to about 15% on a flour basis. It is preferred that this composition be added in an amount ranging from about 4% to about 13%, greater amounts being required as the pH is increased toward pH 9. The amount of the whey protein-containing composition which is utilized is dependent upon the end results desired as far as volume is concerned. The higher the amount of the whey protein-containing material utilized, the higher cake specific volume. However, as the cake specific volume increases there is a decrease in pH which causes problems with color and accentuation of taste or flavor.

The amount of additional soda to be added can be readily determined by existing prior art procedures. These generally include conducting a test bake to determine the pH of the cake containing the whey protein-containing composition. Determination of pH is always conducted on the cake crumb. Appropriate amounts of soda can then be added to elevate the pH to the desired level. Preferably, sufficient additional soda is added to elevate the pH of a batter type cake to within the range of from about 7.5 to about 9 depending on the taste and color to be developed. In connection with chocolate sponge cake, it is preferred that the pH be elevated to within the range of from about 8 and more preferably from about 8.5 to about 9.

Other ingredients which are normal to these cakes can also be included as would be obvious to one of ordinary skill in the art.

The process of the present invention provides a chocolate layer cake of particularly good color and texture, particularly a chocolate sponge cake which is adaptable for machine processing. This machine processed devil's food products are generally of the snack type which include cream-filled, sliced and filled, rolled, and the like. The product of the invention is sufficiently strong to withstand machine processing and lacks the gumminess normally encountered in devil's food cake which causes difficulty with machine slicing.

As used herein, percent protein is on a dry basis based on Total Kjeldahl Nitrogen (TKN) using the factor 6.38 for computation.

EXAMPLES

Chocolate sponge cake was prepared in accordance with the invention using the following basic chocolate sponge cake recipe and procedure:

| Chocolate Sponge Cake Recipe | | | | |
|---|---|---|---|---|
| | | | Flour Basis | |
| Ingredients | Grams | % | Choc. Sponge | Sponge |
| Cake Flour | 262.5 | 23.26 | 100 | 87.5 |
| Cocoa (Choc. Sponge) | 37.5 | 3.32 | 14.29 | — |
| Cake Flour* (Sponge) | (37.5) | (3.32) | — | 12.5 |
| Sugar | 360 | 31.9 | 137 | 120 |
| NFDM | 22.5 | 2.0 | 8.57 | 7.5 |
| Salt | 9.4 | .83 | 3.58 | 3.13 |
| Baking Powder[1] | 8.5 | .75 | 3.24 | 2.83 |
| Emulsifier[2] | 15 | 1.33 | 5.71 | 5 |
| Eggs | 53 | 4.7 | 20.19 | 17.67 |
| Water | 360 | 31.9 | 137 | 120 |
| | 1128.4 | 99.99 | | |

*For Sponge, cocoa is replaced on an equal weight basis with flour.
Variables
Whey Protein Concentrate
Sodium Bicarbonate (Soda)
[1]Double Acting, SALP/Sodium Aluminum Sulfate
[2]ICI Atmos G 2462 - mono-diglycerides plus Tween 60 (polyoxyethylene fatty acid partial esters of sorbitan) and Span 60 (fatty acid partial esters of sorbitan).

Procedure

1. Sift dry ingredients including optional whey protein concentrate and additional soda (with the exception of emulsifier and egg solids) twice.
2. Blend sifted ingredients, emulsifier, egg solids and 60% of the water (100 grams ice and 110 grams ice water at 10° C.–50° F.) in a 2.84 liter (3 quart) Hobart C-100 mixer at speed 1 for ½ minute using a wire whip and scrape.
3. Mix:
   1 minute at speed 2 and scrape,
   3 minutes at speed 3 and scrape,
   3 minutes at speed 3 and scrape.
4. Add remaining water (150 grams ice water at 3.3°–4.4° C. or 38°–40° F.), vanilla extract if desired, and mix:
   ½ minute at speed 2 and scrape,
   4 minutes at speed 1 and scrape,
   2 minutes at speed 2 and scrape.
5. Scale 280 grams of batter into an ungreased lined 16.25 cm (6½ inch) tube pan and bake at 190° C. (375° F.) for 28–30 minutes.
6. Cool on rack for one hour before depanning and evaluating.

Specific volume was obtained by the rape seed method. Crumb pH was determined by uniformly blending 10 grams of crumb in 90 grams distilled water and measuring pH by electronic meter.

As used herein, WPC means whey protein concentrate. As denoted in the following tables, type (1) WPC is ENRPRO-50, a 50% WPC obtained by ultrafiltration of acid whey and type (2) is a blend of 50% type (a), 20% calcium caseinate and 30% calcium treated delactosed whey. The grouping of examples in Tables does not mean that these were all run on the same day.

The percent whey protein concentrate and/or additional baking soda added is on a flour basis.

The results are reported in the Tables which follow:

TABLE 1

Chocolate Sponge Cake

| Example No. | WPC % | Baking Soda % Excess | Cake Spec. Vol.* | Cake pH | Grain/Texture |
|---|---|---|---|---|---|
| 1 | 0 | 0 | 3.83 | 7.37 | — |
| 2 | 4.3[2] | 0 | 3.75 | 7.34 | — |
| 3 | 8.6[2] | 0 | 3.89 | 7.31 | — |
| 4 | 12.9[2] | 0 | 3.70 | 7.22 | — |
| 5 | 0 | 0.15[a] | 3.90 | 7.60 | — |
| 6 | 4.3[2] | 0.15 | 4.03 | 7.52 | — |
| 7 | 8.6[2] | 0.15 | 4.04 | 7.45 | — |
| 8 | 12.9[2] | 0.15 | 3.89 | 7.38 | — |
| 9 | 0 | .24[b] | 3.99 | 7.75 | — |
| 10 | 4.3[2] | .24 | 3.98 | 7.60 | — |
| 11 | 8.6[2] | .24 | 4.13 | 7.58 | — |
| 12 | 12.9[2] | .24 | 4.11 | 7.51 | — |

[a]15% excess soda - assuming 30% soda in the 8.5 grams of baking powder, 15% excess is 0.4 grams.
[b]25% excess soda - 0.64 grams
*Average of two results Regularity of results between various bakes is dependent on maintaining uniform batter temperature, the precision of scaling of ingredients, type of wire whip used, manner and rigorousness of scraping, water hardness and calibration of rapeseeds.

TABLE 2

Chocolate Sponge Cake

| Example No. | WPC % | Baking Soda % Excess | Cake Spec. Vol. | Cake pH | Grain/Texture |
|---|---|---|---|---|---|
| 13 | 0 | .7 | 4.29 | 8.43 | — |
| 14 | 4.3[2] | 1 | 4.35 | 8.63 | — |
| 15 | 8.6[2] | 1.2 | 4.54 | 8.69 | — |
| 16 | 12.9[2] | 1.4 | 4.55 | 8.66 | Firmer-easier to slice |
| 17 | 0 | .7 | 4.33 | 8.42 | Soft, too tender, fine grain |
| 18 | 4.3[1] | 1 | 4.38 | 8.70 | V-fine grain |
| 19 | 8.6[1] | 1.2 | 4.46 | 8.70 | V-fine grain |
| 20 | 12.9[1] | 1.4 | 4.55 | 8.73 | V-fine grain. Drier, firmer, easier to slice |

(Note: Examples 13-16, last water added to batter at 10° C.-50° F.)

Cakes prepared with extra soda and whey protein concentrate had fine grain, good eating quality, elasticity and drier elastic texture as well as being very easy to slice. Control cake was too tender.

TABLE 3

| Ex. No. | WPC % | Baking Soda % Excess | Cake Specific Volume 1st Run Ave. | Rerun Ave. | pH 1st | pH Rerun |
|---|---|---|---|---|---|---|
| 21 | 0 | 0 | 4.18 \ 4.15 / 4.13 | 4.02 \ 4.01 / 4.01 | 7.40 | (7.41) |
| 22 | 4.3[1] | 0 | 4.16 \ 4.14 / 4.12 | | 7.36 | |
| 23 | 8.6[1] | 0 | 4.22 \ 4.22 / 4.21 | | 7.28 | |
| 24 | 12.9[1] | 0 | 4.33 \ 4.34 / 4.35 | | 7.23 | |

The cake of Example 22 was fine, uniform and tender. The cakes of Examples 23 and 24 were fine and resilient.

TABLE 4

| Ex. No. | WPC % | Baking Soda % Excess | Cake Specific Volume 1st Run Ave. | Rerun Ave. | pH 1st | pH Rerun |
|---|---|---|---|---|---|---|
| 25 | 0 | 0.19 | 3.99 \ 4.00 / 4.00 | 3.95 \ 3.90 / 3.85 | 7.67 | (7.59) |
| 26 | 4.3[1] | 0.19 | 4.29 \ 4.31 / 4.34 | 3.98 \ 3.97 / 3.95 | 7.59 | (7.45) |
| 27 | 8.6[1] | 0.19 | 4.20 \ 4.27 / 4.34 | 4.13 \ 4.05 / 3.97 | 7.51 | (7.43) |
| 28 | 12.9[1] | 0.19 | 4.16 \ 4.30 / 4.44 | 4.13 \ 4.16 / 4.20 | 7.45 | (7.39) |
| Rerun of Ex. 25 | | | 4.12 \ 4.21 / 4.29 | | 7.66 | |

TABLE 5

| Ex. No. | WPC % | Baking Soda % Excess | Cake Specific Volume 1st Run Ave. | Rerun Ave. | pH 1st | pH Rerun |
|---|---|---|---|---|---|---|
| 29 | 0 | 0.39 | 4.46 \ 4.46 / 4.45 | 4.18 \ 4.17 / 4.16 | 2.95 | (8.01) |
| 30 | 4.3[1] | 0.39 | 4.41 \ 4.41 / 4.40 | | 7.82 | |
| 31 | 8.6[1] | 0.39 | 4.50 \ 4.54 / 4.57 | | 7.77 | |

TABLE 5-continued

| Ex. No. | WPC % | Baking Soda % Excess | Cake Specific Volume 1st Run Ave. | Rerun Ave. | pH 1st | Rerun |
|---|---|---|---|---|---|---|
| 32 | 12.9(1) | 0.39 | 4.55 \ 4.55 / 4.54 | | 7.67 | |

TABLE 6

| Ex. No. | WPC % | Baking Soda % Excess | Cake Specific Volume 1st Run | Rerun | 3rd Run |
|---|---|---|---|---|---|
| 33 | 0 | 0.57 | 3.99 \ 4.19 / 4.37* (pH 8.11) | 3.97 \ 3.94 / 3.91 (8.01) | 4.20 \ 4.21 / 4.21 (8.06) |
| 34 | 4.3(2) | 0.71 | 4.10 \ 4.27 / 4.44* (pH 8.25) | 3.91 \ 3.92 / 3.92 (8.10) | 4.16 \ 4.18 / 4.19 (8.06) |
| 35 | 8.6(2) | 0.77 | 4.12 \ 4.30 / 4.47* (pH 8.27) | 3.91 \ 3.95 / 4.00 (8.13) | 4.17 \ 4.27 / 4.36 (8.04) |
| 36 | 12.9(2) | 0.85 | 4.09 \ 4.10 / 4.11 (pH 8.31) | 4.10 \ 4.11 / 4.11 (8.12) | 4.62 \ 4.60 / 4.58 (8.09) |

Data which is not in conformity (such as that marked *) is speculated to be due to high batter temperature. While yields can increase, texture and structure tend to suffer.

EXAMPLES 37–40

A series of chocolate sponge cakes were prepared to determine the effect of excess baking powder on specific volume. The same formulation as used in Example 1 (no WPC and no excess soda) was used. The temperature for addition of the 150 grams ice water was 10° C. (50° F.). The excess baking powder did not have a significant effect on volume.

TABLE 7

| Example No. | Baking Powder % Excess* | Cake pH | Cake Specific Vol. |
|---|---|---|---|
| 37 | 0 | 7.39 | 3.68 |
| 38 | 10 | 7.42 | 3.68 |
| 39 | 15 | 7.45 | 3.75 |
| 40 | 20 | 7.46 | 3.68 |

*Based on 8.5 grams baking powder in control.

What is claimed is:

1. In a process for preparing a chocolate flavored cake comprising mixing together and baking the ingredients comprising flour, water, egg, sugar, chocolate or cocoa, milk or non-fat dry milk, oil or shortening, salt, baking powder and emulsifier, the improvement comprising adding to said ingredients (1) a whey-protein-containing composition in an amount of about 3% to about 15% on a flour basis, in combination with (2) an amount of sodium bicarbonate sufficient to elevate the pH of the cake crumb to a pH within the range of from 7.5 to about 9, wherein said whey protein-containing composition comprises: (a) at least about 40% of a whey protein concentrate having at least 35% whey protein, (b) from 0 to about 50% of a second whey protein-containing composition different from said whey protein concentrate (a), and (c) from 0 to about 35% of another dairy protein-containing product, the total protein in said whey protein-containing composition being at least 50% whey protein whereby the resulting chocolate flavored cake is characterized by good volume, good color and good flavor.

2. The process as recited in claim 1 wherein said cake is a chocolate sponge cake.

3. The process as recited in claim 1 wherein said whey protein-containing composition is added in an amount ranging from about 80% to about 100%.

4. The process as recited in claim 1 wherein said whey protein-containing composition is at least 90% whey protein concentrate.

5. The process as recited in claim 4 wherein said whey protein concentrate is derived by ultrafiltering acid cheese whey.

6. The process as recited in claim 2 wherein the pH of the crumb is within the range of from about 8.5 to about 9.0.

7. The process as recited in claim 1 wherein said cake has a specific volume of at least 4.0.

* * * * *